United States Patent
Chang et al.

(10) Patent No.: US 9,201,184 B2
(45) Date of Patent: Dec. 1, 2015

(54) LIGHT GUIDE PLATE AND BACKLIGHT MODULE

(71) Applicant: AU Optronics Corporation, Hsin-Chu (TW)

(72) Inventors: Yi-Wen Chang, Hsin-Chu (TW); Fu-Cheng Fan, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 118 days.

(21) Appl. No.: 14/139,989

(22) Filed: Dec. 24, 2013

(65) Prior Publication Data

US 2014/0185321 A1    Jul. 3, 2014

(30) Foreign Application Priority Data

Dec. 27, 2012    (TW) .............................. 101150479 A

(51) Int. Cl.
    *F21V 7/04*    (2006.01)
    *F21V 8/00*    (2006.01)

(52) U.S. Cl.
    CPC ...................................... *G02B 6/002* (2013.01)

(58) Field of Classification Search
    CPC .......... G02B 6/00; G02B 6/0001; G02B 9/02; G02B 9/04; G02B 9/12
    USPC ......................................... 362/615, 616, 621
    See application file for complete search history.

(56) References Cited

U.S. PATENT DOCUMENTS

| | | | |
|---|---|---|---|
| 7,540,646 B2 * | 6/2009 | Naoi .............................. | 362/558 |
| 2002/0172039 A1 | 11/2002 | Inditsky | |
| 2008/0043171 A1 * | 2/2008 | Takahashi et al. .............. | 349/65 |
| 2009/0033832 A1 * | 2/2009 | Pai ................................... | 349/65 |
| 2011/0205759 A1 * | 8/2011 | Kurata et al. ................. | 362/611 |
| 2011/0286237 A1 | 11/2011 | Tanoue et al. | |
| 2012/0300496 A1 | 11/2012 | Chang et al. | |

FOREIGN PATENT DOCUMENTS

| | | |
|---|---|---|
| CN | 102245962 A | 11/2011 |
| JP | 2011-138698 A | 7/2011 |
| TW | 201013119 | 4/2010 |
| TW | 201248267 A | 12/2012 |

OTHER PUBLICATIONS

English translation of abstract of JP 2011-138698 A (published Jul. 14, 2011).
English translation of abstract of TW 201013119 (published Apr. 1, 2010).
Taiwan Office Action dated Sep. 18, 2014.

* cited by examiner

*Primary Examiner* — Ali Alavi
(74) *Attorney, Agent, or Firm* — McClure, Qualey & Rodack, LLP

(57) ABSTRACT

A light guide plate includes a plate body and a light incident portion, wherein the plate body has a top plate surface. The light incident portion is formed on a side of the plate body and has a thickness increasing as the light incident portion extends away from a center of the plate body. In addition, the light incident portion has a top surface connected to the top plate surface and lifted from the top plate surface to include an angle with the top plate surface. The top surface includes a first incline and a second incline, wherein the first incline connects to a side of the top plate surface and has a first average slope. The second incline has a side connected to a side of the first incline opposite to the top plate surface and has a second average slope larger than the first average slope.

20 Claims, 15 Drawing Sheets

LIGHT GUIDE PLATE AND BACKLIGHT MODULE

BACKGROUND OF THE INVENTION

1. Field of the Invention

The present invention generally relates to a light guide plate and a backlight module; particularly, the present invention relates to a light guide plate and a backlight module with increased light guide efficiency.

2. Description of the Prior Art

In general, according to position of light source in a backlight module, backlight modules at least include edge type backlight modules and direct type backlight modules. For instance, the edge type backlight modules have advantages of slim, high light-generating efficiency, and are widely applied in display devices.

Please refer to FIG. 1; FIG. 1 is a side view of a conventional edge type backlight module. As shown in FIG. 1, the backlight module 12 includes a side light source 12A, a light guide plate 12B, and a wedge body 12C, wherein the side light source 12A is disposed on a side of the light guide plate 12B, and the wedge body 12C is connected adjacently with the side light source 12A and the light guide plate 12B. In addition, the wedge body has a wedge width W, the light guide plate 12 has a thickness T1, and thickness T2 is the biggest thickness of the wedge. Practically, the wedge body 12C assists to guide the light generated from the side light source 12A into the light guide plate 12B so as to increase inner guiding energy.

FIG. 2 is a curve diagram showing light guide efficiency of a conventional edge type backlight module. As shown in FIG. 2, the light guide efficiency of the backlight module 12 obviously gets worse when the thickness T1 of the light guide plate 12B is reducing, the thickness T2 is increasing, or the wedge width W is reducing. In addition, as light-guide-efficiency curve C4 in FIG. 2 shows, the thickness T2 is 0.6 mm, the wedge width W is 0.5 mm. For the purpose of thinner, as the thickness T1 of the light guide plate 12B is 0.2 mm, the light-guide-efficiency is 35%, it is unable to acquire better light-guide-efficiency. Take the light-guide-efficiency curve C3, after increasing the wedge width W from 0.5 mm to 2.0 mm, the best light-guide-efficiency of the light guide plate 12B with the thickness T1 0.2 mm is 45%, and the hot spot defective rate is 5%, it cannot achieve the efficacy of thinner and high light guide efficiency at the same time.

SUMMARY OF THE INVENTION

It is an object of the present invention to provide a backlight module, which improves light guide efficiency and adjust light field.

In one aspect, the present invention provides a backlight module, which includes a two-stage type wedge structure to improve light guide efficiency.

On another aspect, the present invention provides a backlight module, which adjusts the light field by changing travelling direction of the light.

In one embodiment, a light guide plate of the present invention includes a plate body and a light incident portion, wherein the plate body has a top plate surface. The light incident portion is formed on a side of the plate body, the light incident portion having a thickness increasing as the light incident portion extends away from a center of the plate body. In addition, the light incident portion has a top surface connected to the top plate surface and lifted from the top plate surface to include an angle with the top plate surface. The top surface includes a first incline and a second incline, wherein the first incline connects to the side of the top plate surface and has a first average slope. The second incline has a side connected to a side of the first incline opposite to the top plate surface, wherein the second incline has a second average slope larger than the first average slope, and the inner angle between the second incline and the plane parallel to the top plate surface is larger than 18 degrees.

In addition, in another embodiment, the backlight module of the present invention includes the light guide plate and a light source module, wherein the light source module transmits a light to the light incident portion. Furthermore, the light incident portion includes a lower light incident surface and an upper light incident surface, wherein the lower light incident surface and the upper light incident surface respectively receive a lower light and an upper light generated from the light source module. In the embodiment, the lower light travels in the light guide plate along a first travelling direction after being reflected by the first incline; and the upper light travels in the light guide plate along a second travelling direction after being reflected by the second incline. In the embodiment, a projection of the upper light incident surface perpendicular to a plane parallel to the top plate surface is closer to the second incline than the lower light incident portion is, and the first travelling direction is approximately parallel to the second travelling direction.

In comparison with prior arts, the backlight module of the present invention utilizes the light incident portion to change the travelling direction of light, wherein the light is reflected by the first incline and the second incline, so that the light can enter the body along a travelling direction approximately parallel to each other. Preferably, in addition, the backlight module of another embodiment of the present invention utilizes the upper light incident surface and the lower light incident surface layer to adjust the travelling direction of the upper light and the lower light so as to guide light uniformly.

The above and other objects, features and advantages of the present invention will be more clearly understood from the following detailed description taken in conjunction with the accompanying drawings.

BRIEF DESCRIPTION OF THE DRAWINGS

FIG. 4A(II) is the distribution diagram of the hot spot defective rate of the backlight module of the present embodiment;

FIG. 4B(II) is another exemplary distribution diagram of the hot spot defective rate of the backlight module of the present invention;

FIG. 4C(II) is another distribution diagram of the hot spot defective rate of the backlight module of the present embodiment;

DETAILED DESCRIPTION OF THE PREFERRED EMBODIMENT

According to one embodiment, the present invention provides a backlight module and a light guide plate, which improves light guide efficiency. In the embodiment, the backlight module is preferably an edge type backlight module.

Figure 1:
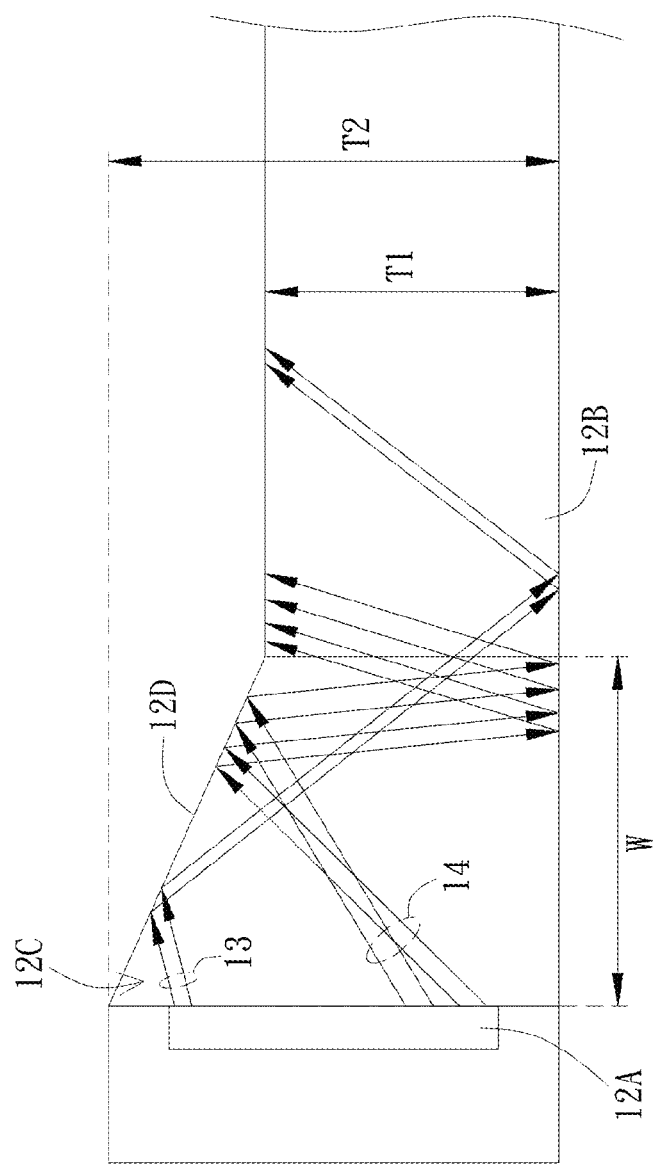
FIG. 1 is a side view of a conventional edge type backlight module.
Figure 2:
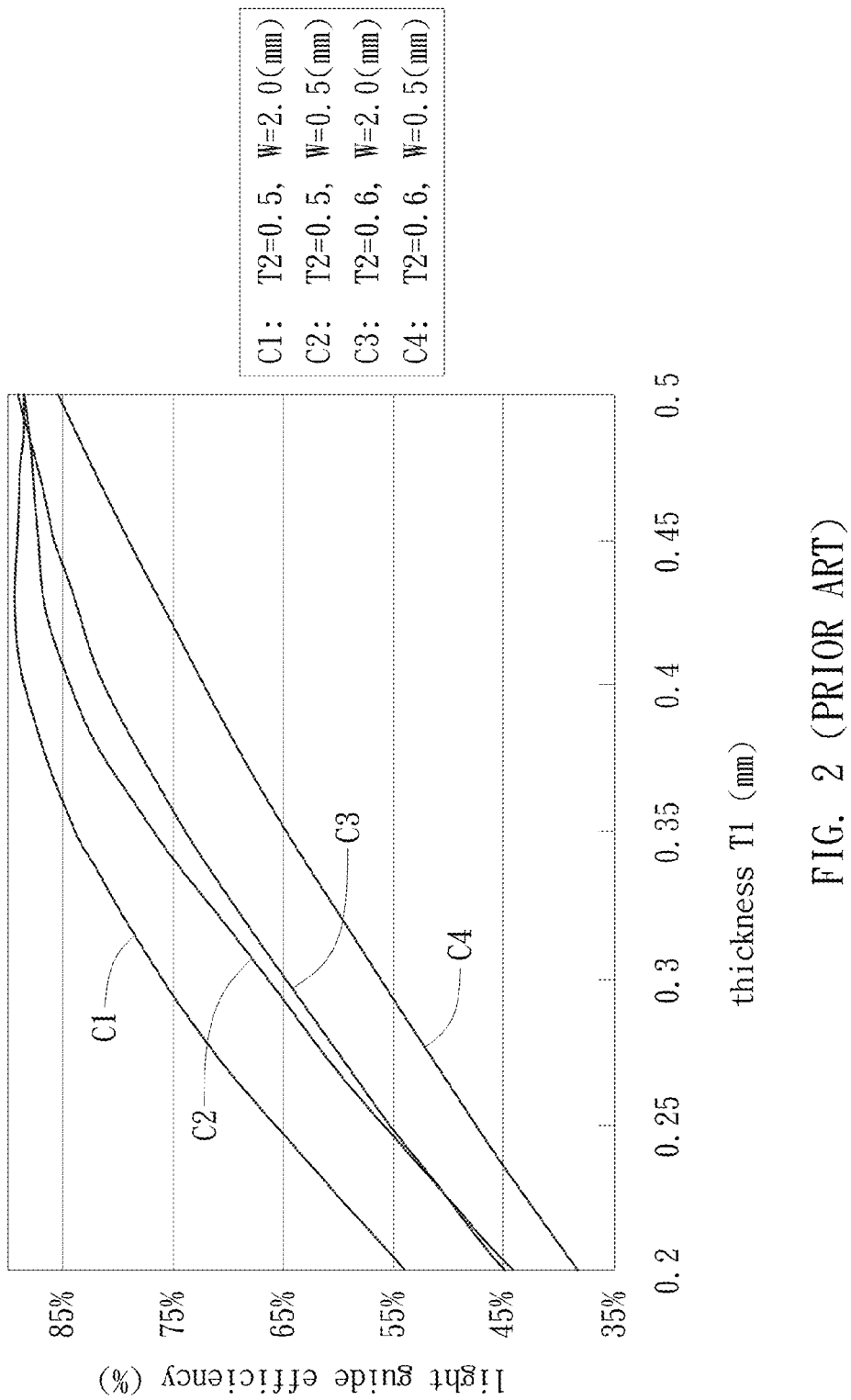
FIG. 2 is a curve diagram showing light guide efficiency of a conventional edge type backlight module.
Figure 3A:
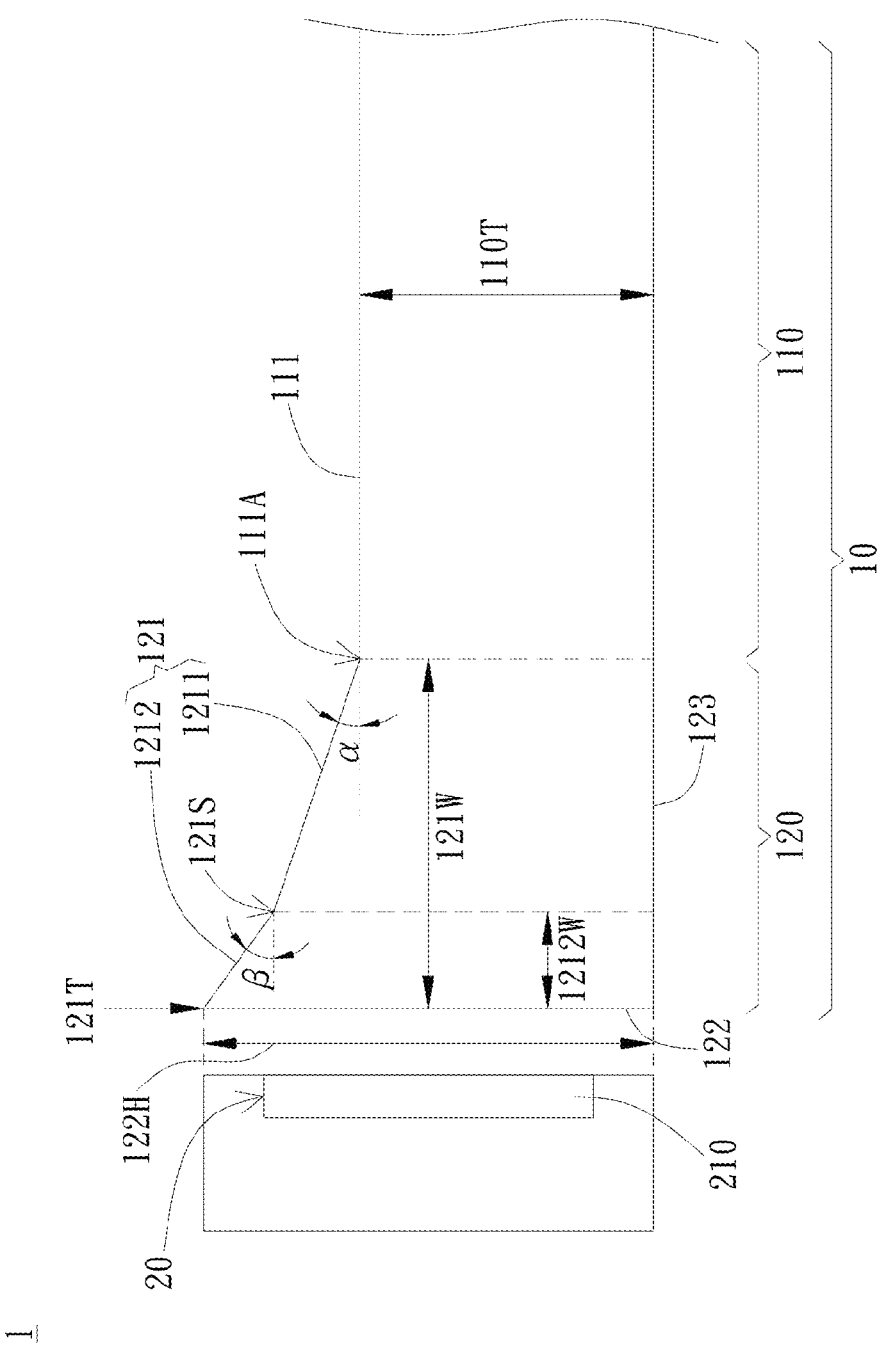
FIG. 3A is a cross-sectional view of a backlight module of the present invention.
Figure 3B:
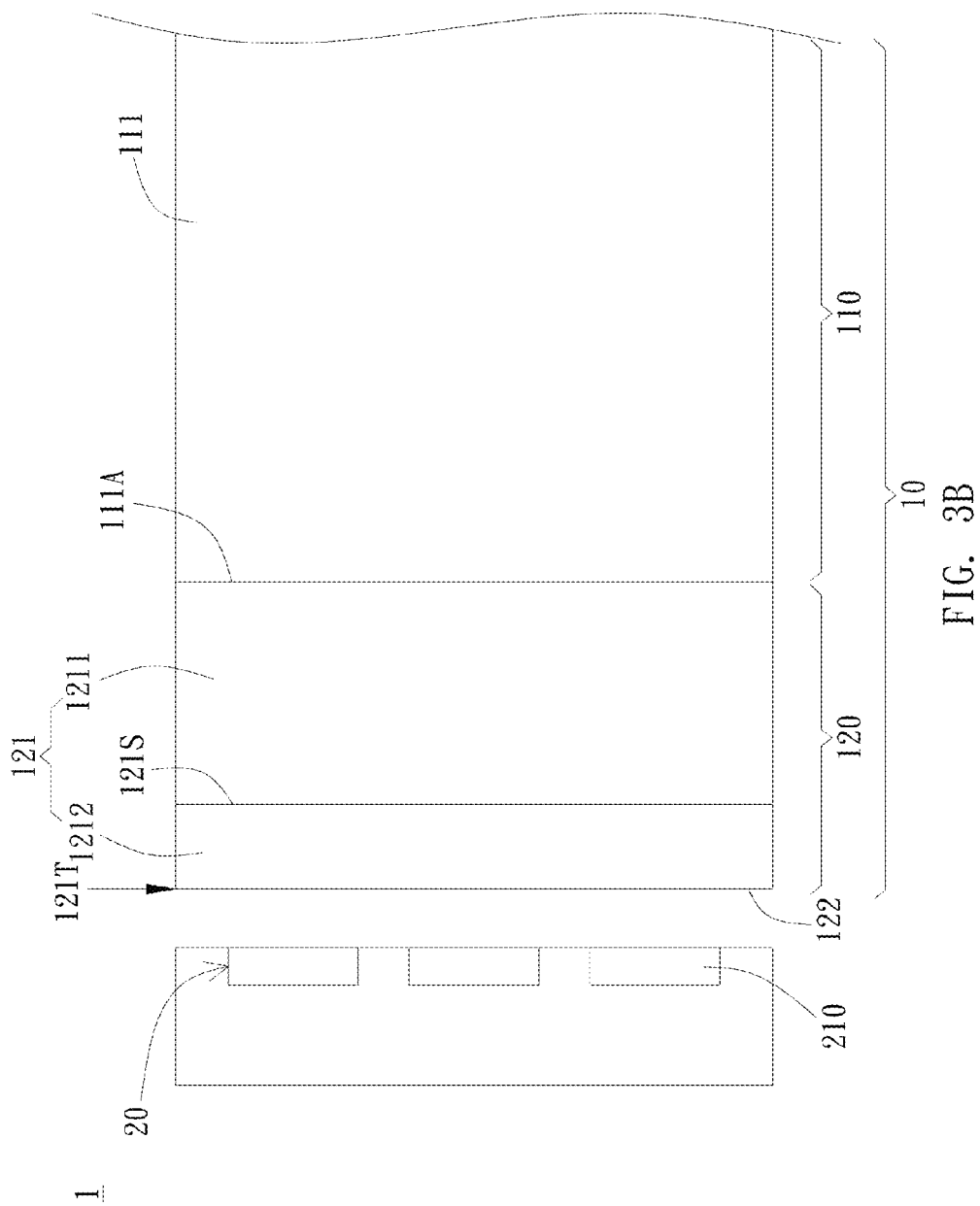
FIG. 3B is a top view of the backlight module of the present invention.

Please refer to FIGS. 3A and 3B; FIG. 3A is a cross-sectional view of a backlight module of the present invention, and FIG. 3B is a top view of the backlight module of the present invention. As shown in FIGS. 3A and 3B, the backlight module 1 includes a light guide plate 10 and a light source module 20, wherein the light guide plate 10 includes a plate body 110 and a light incident portion 120, and the light source module 20 transmits a light to the light incident portion 120. Preferably, the light source module 20 includes a plurality of light-emitting units 210, wherein the light-emitting units can be LEDs (light-emitting diodes) or other luminescence units. However, in other embodiments, the light source module can be a CCFL (cold-cathode fluorescent lamp) or other light-emitting bar structure.

As shown in FIG. 3B, the light incident portion 120 is formed on a side 111A of the plate body 110, the light incident portion 120 has a thickness increasing as the light incident portion 120 extends away from a center of the plate body 110. In addition, please refer to FIG. 3A, the plate body 110 has a top plate surface 111, and the light incident portion 120 has a top surface 121 connected to the top plate surface 111 and lifted from the top plate surface 111 to include an angle α with the top plate surface 111.

The top surface 121 includes a first incline 1211 and a second incline 1212, wherein the first incline 1211 connects to the side 111A of the top plate surface 111 and has a first average slope. In other words, the side 111A is a common side for both the top plate surface 111 and the first incline 1211.

In addition, the second incline 1212 has a side 121S connected to the side of the first incline 1211 opposite to the top plate surface 111. In other words, the first incline 1211 and the second incline 1212 have common side 121S, and the first incline 1211 is connected to the second incline 1212 by the side 121S. Preferably, the second incline 1212 has a second average slope larger than the first average slope, wherein the inner angle β between the second incline 1212 and a plane parallel to the top plate surface 111 is larger than the inner angle α between the first incline 1211 and the plane parallel to the top plate surface 111.

It is noted that the light guide plate 10 provides good light-guide efficiency when the inner angle β between the second incline 1212 and the plane parallel the top plate surface 111 is between 14 degrees and 18 degrees. In addition, the output light from the light guide plate 10 is more uniform; the light guide plate 10 can provide a more preferable light-guide efficiency especially when the inner angle is between 18 degrees and 26 degrees. It is noted that when the inner angle β between the second incline 1212 and the plane parallel the top plate surface 111 is larger than 26 degrees, the first incline 1211 and the second incline 1212 can guide the light to be transmitted to the light guide plate 10 along a travelling direction approximately parallel to each other, so that the light guide plate 10 has excellent light guide efficiency. Detailed effect of the light guide efficiency will be further illustrated in embodiments shown in FIGS. 4A(I) to 4C(II).

Preferably, the inner angle β between the second incline 1212 and the plane including the top plate surface 111 is larger than 18 degrees, and also larger than angle α. In other words, if the plane parallel the top plate surface 111 is a horizontal plane, the first incline 1211 is flatter while the second incline 1212 is steeper. In addition, as shown in FIG. 3A, the light incident portion 120 includes a light incident surface 122 perpendicular to the top plate surface 111, and the light incident surface 122 is connected to the side of the second incline 1212 that is opposite to the first incline 1211 to form a ridge line 121T. In this embodiment, a projection of the second incline 1212 on the plane parallel the top plate surface 111 has a second incline width 1212W, a projection of the top surface 121 on the plane parallel the top plate surface 111 has a total width 121W, and a ratio of the second incline width 1212W to the total width 121W is less than or equal to 29%.

Figure 3C:
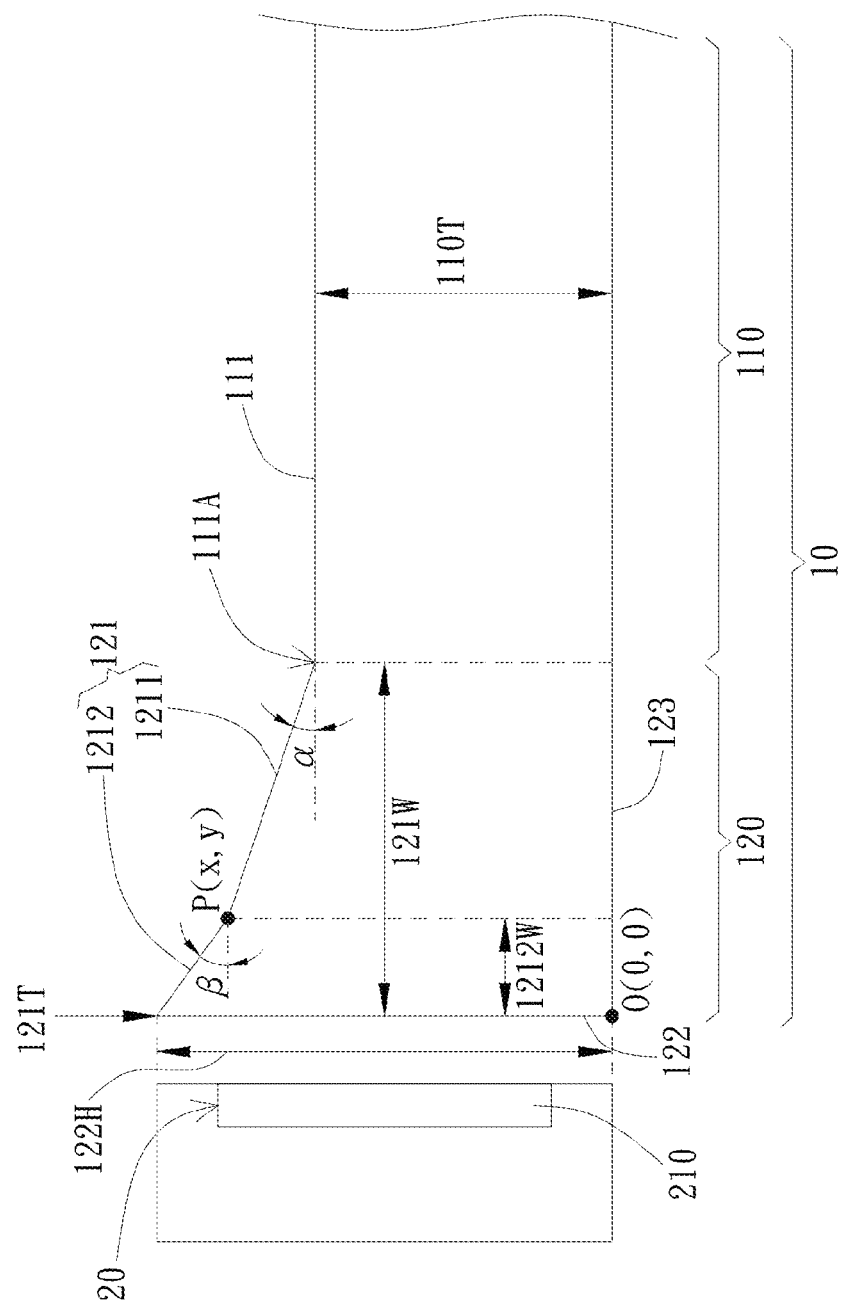
FIG. 3C is a cross-sectional view of the embodiment of the backlight module of the present invention.

Please refer to FIG. 3C; FIG. 3C is a cross-sectional view of the embodiment of the backlight module of the present invention. It is noted that the backlight module shown in FIG. 3C is substantially the same as the backlight module of FIGS. 3A and 3B, FIG. 3C is utilized to illustrate the structure ratio of the first incline 1211 and the second incline 1212. Preferably, the light incident portion 120 has a base surface 123 opposite to the first incline 1211 and the second incline 1212. As shown in the cross-sectional view of FIG. 3C, the intersection of the base surface 123 and the light incident surface 122 is defined as the initial point O(0, 0), the intersection of the first incline 1211 and the second incline 1212 is defined as the intermediate point P(x, y). In other words, the value of the X coordinate of the intermediate point P is the second incline width 1212W, and the value of the Y coordinate of the intermediate point P is a total length of the thickness 110T of the plate body 110 plus the projection height of the first incline 1211 on the light incident surface 122.

In preferred embodiment, a ratio of the thickness 110T of the plate body 110 to a height 122H of the light incident surface 122 is less than or equal to 0.42. Exemplarily, the thickness 110T of the plate body is 0.25 mm, and the height 122H of the light incident surface 122 is 0.6 mm. Alternatively, this ratio can be used to determine the relation between the longitudinal height of the plate body and the light incident surface.

Figure 4A:
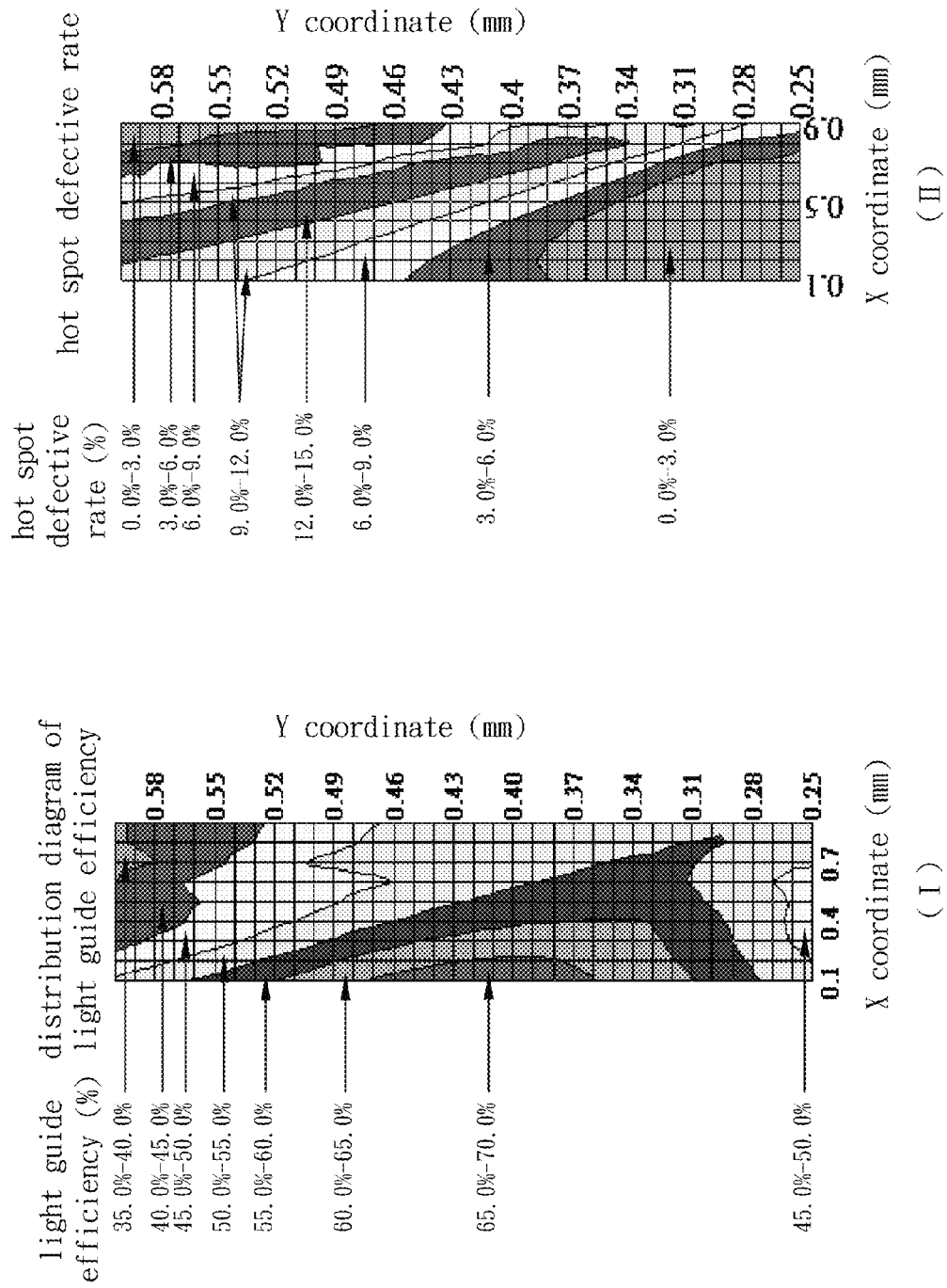
FIG. 4A(I) is a distribution diagram of the light guide efficiency of the backlight module of the present embodiment.

For instance, the distribution diagram of FIG. 4A(I) is obtained when the total width 121W is 1 mm, the X coordinate of the intermediate point P is between 0.1 mm to 0.9 mm, and the Y coordinate of the intermediate point P is between 0.25 mm to 0.6 mm. FIG. 4A(I) is a distribution diagram of the light guide efficiency of the backlight module of the present embodiment, and FIG. 4A(II) is the distribution diagram of the hot spot defective rate of the backlight module of the present embodiment, wherein the light guide efficiency of the backlight module is evaluated by a normalized result of dividing the energy entering the rear side of the light guide plate 10 by the energy of LED, the hot spot defective rate is evaluated by a normalized result of dividing the energy received on non-display area as the invalid light or invalid hot spot by the energy of LED. When the X coordinate (the second incline width 1212W) and the Y coordinate fall inside the triangle range defined by 3 vertices (0.1, 0.25), (0.1, 0.55), and (0.7, 0.25), the backlight module 1 has preferred light guide efficiency. Furthermore, considering the light guide efficiency and the hot spot defective rate and comparing the hot spot defective rate of the intermediate point P at different positions, the preferred position of the intermediate point P is (0.1, 0.40), wherein the light guide efficiency is 67%, and the hot spot defective rate is 4.27%.

In other words, the distribution diagram of the light guide efficiency of FIG. 4A(I) and the distribution diagram of the hot spot defective rate of FIG. 4A(II) can be used to define the preferred position of the intermediate point P and further adjust the structure ratio between the first incline 1211 and the second incline 1212 of the light incident portion.

Figure 4B:
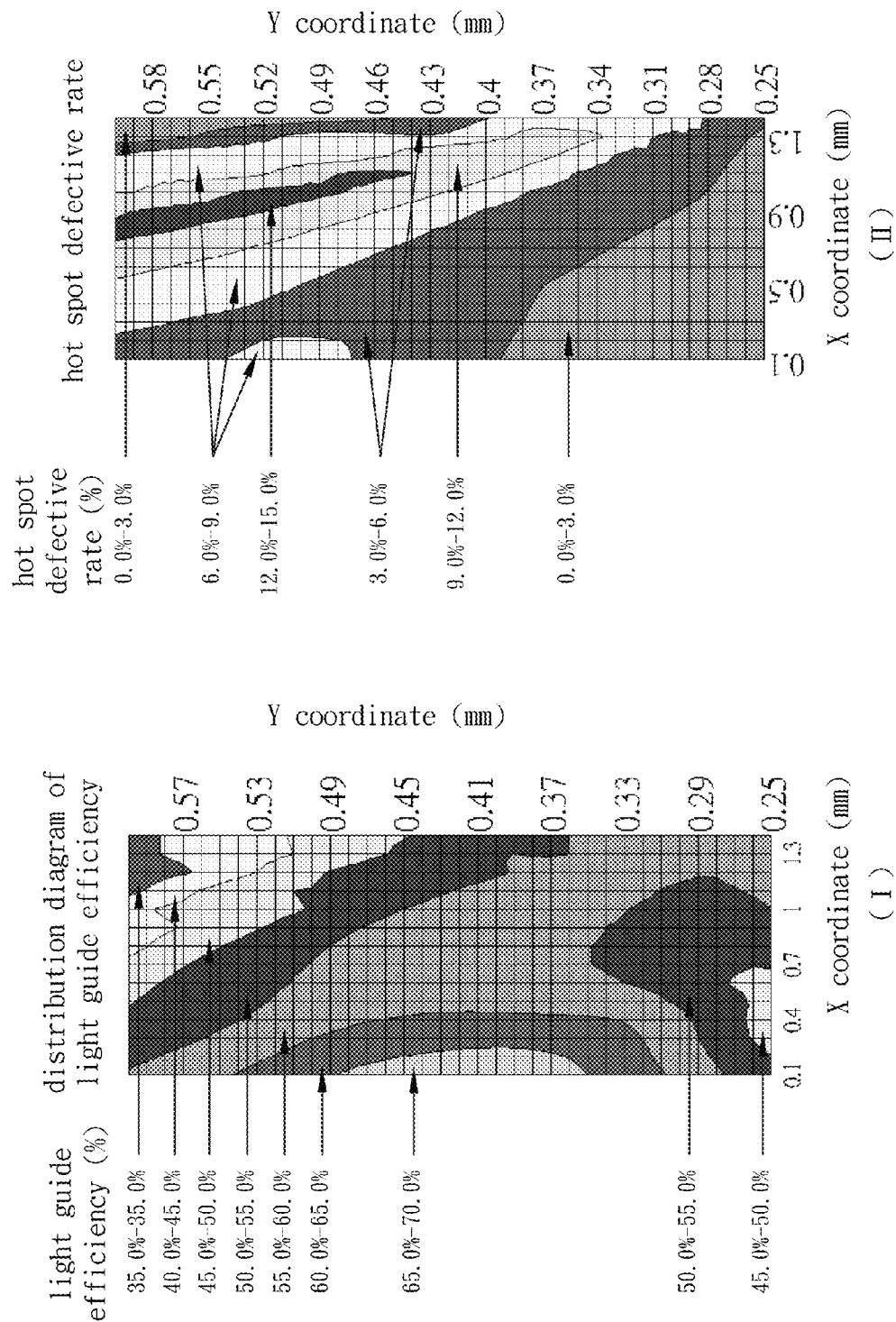
FIG. 4B(I) is another exemplary distribution diagram of the light guide efficiency of the backlight module of the present invention.

In addition, another embodiment further provides light guide plates having other structures according to the light incident portion having different ratio. Please refer to FIGS. 4B(I) and 4B(II), wherein FIG. 4B(I) is another exemplary distribution diagram of the light guide efficiency of the backlight module, and FIG. 4B(II) is another exemplary distribution diagram of the hot spot defective rate of the backlight module. It is noted that, comparing with FIG. 4A(I) or 4A(II), the total width 121W of the light incident portion 120 in FIGS. 4B(I) and 4B(II) is 1.5 mm. In this distribution diagram, when the X coordinate and the Y coordinate fall inside the triangle range defined by 3 vertices (0.1, 0.25), (0.1, 0.55), and (1.0, 0.25), the backlight module 1 has preferred light guide efficiency. In addition, considering with the light guide efficiency and the hot spot defective rate, the preferred position of the intermediate point P is (0.1, 0.42), wherein the light guide efficiency is 68%, and the hot spot defective rate is 4.17%.

Figure 4C:
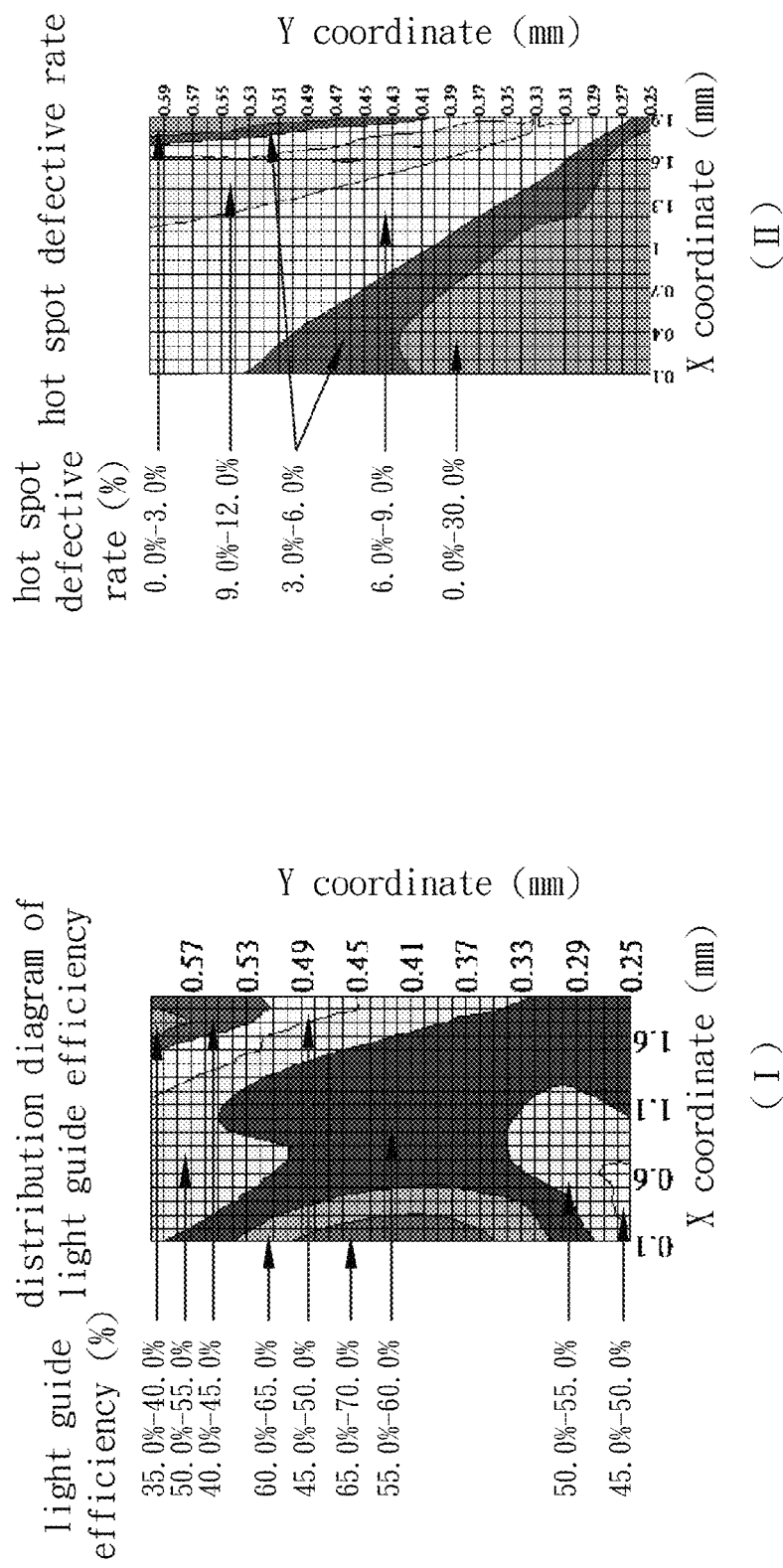
FIG. 4C(I) is another distribution diagram of the light guide efficiency of the backlight module of the present embodiment.

In addition, FIGS. 4C(I) and 4C(II) are obtained when the total width 121W of the light incident portion 120 is 2.0 mm, wherein FIG. 4C(I) is another distribution diagram of the light guide efficiency of the backlight module of the present embodiment, and FIG. 4C(II) is another distribution diagram of the hot spot defective rate of the backlight module of the present embodiment. In the distribution diagram, when the X coordinate and the Y coordinate fall inside the triangle range formed by 3 vertices (0.1, 0.25), (0.1, 0.55), and (1.0, 0.25), the backlight module 1 has preferred light guide efficiency. In addition, considering with the light guide efficiency and the hot spot defective rate, the preferred position of the intermediate point P is (0.1, 0.43), wherein the light guide efficiency is 68.9%, and the hot spot defective rate is 3.27%.

According to the results of FIGS. 4A(I) to 4C(II), the light guide plate 10 has preferred light guide efficiency while the ratio of the second incline width 1212W to the total width 121W is larger than or equal to 5%. In addition, the inner angle β between the second incline 1212 and the plane parallel the top plate surface 111 is larger than 26.5 degrees when the ratio of the second incline width 1212W to the total width 121W is less than or equal to 22%. Accordingly, the backlight module 1 of the present invention effectively increases the light guide efficiency and solves the hot spot issue to improve non-uniform brightness phenomena.

Figure 5A:
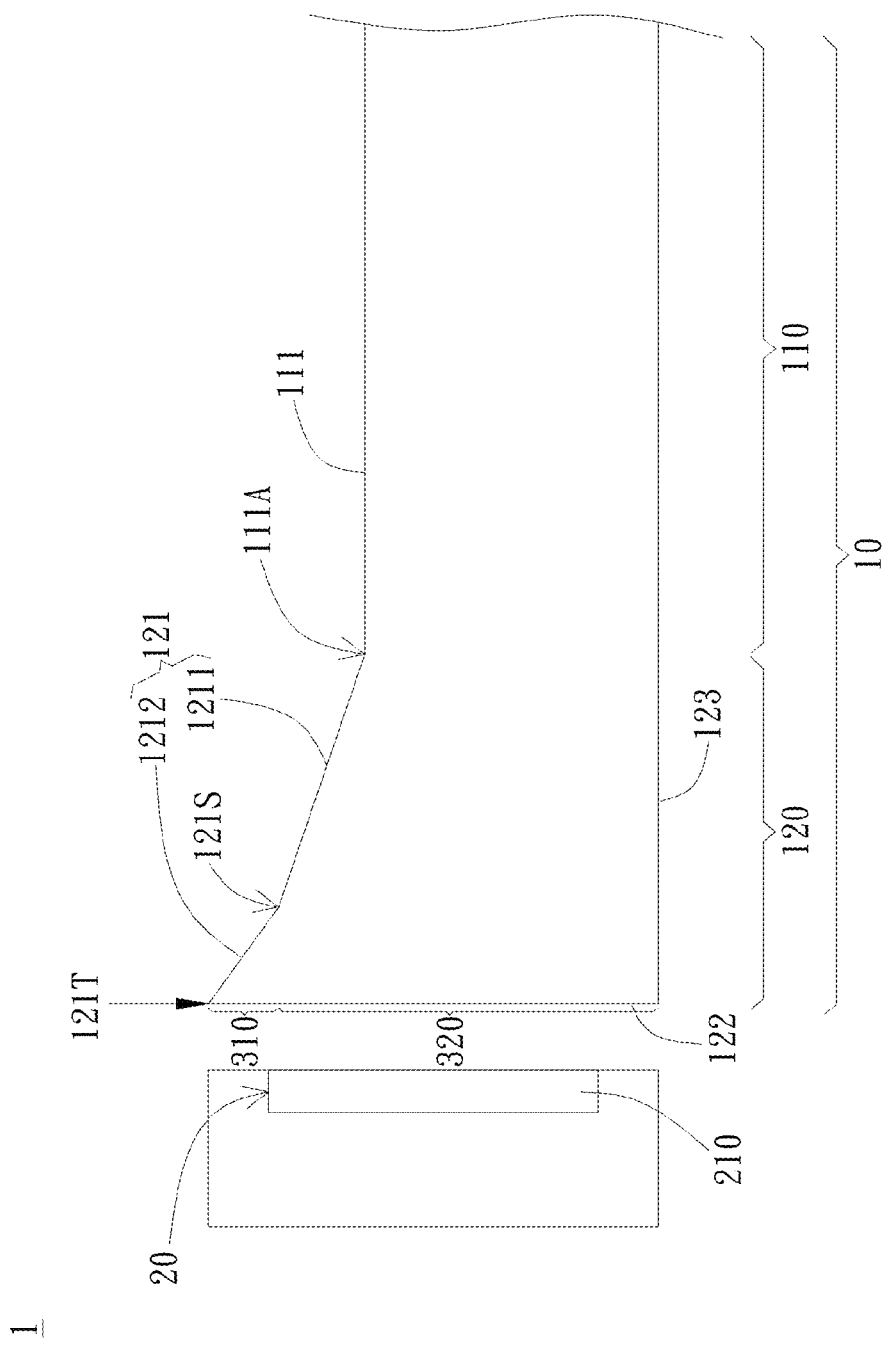
FIG. 5A is an exemplary cross-sectional view of one embodiment of the backlight module of the present invention.
Figure 5B:
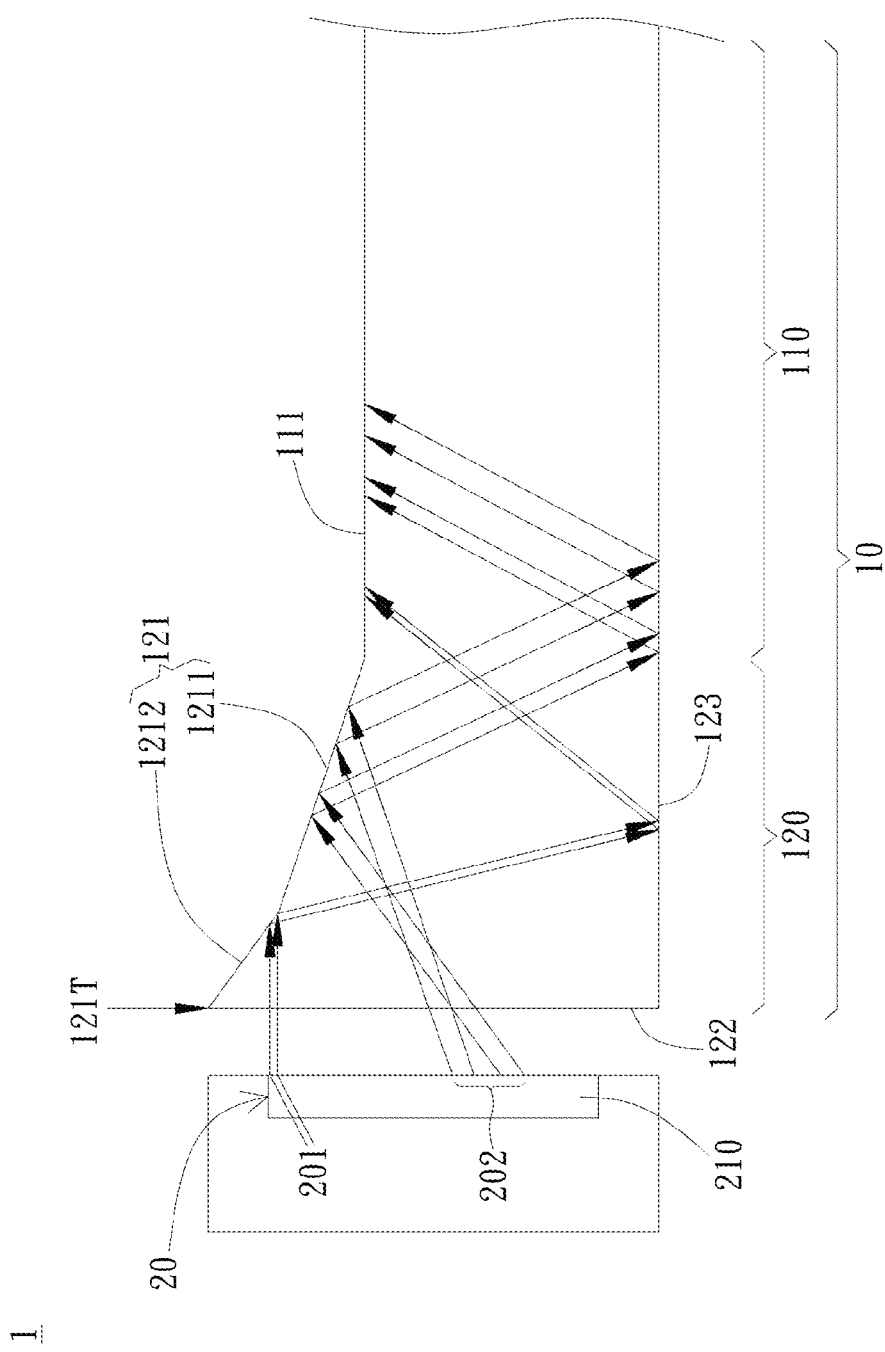
FIG. 5B is an exemplary cross-sectional view of the one embodiment of the backlight module of the present invention with some light-raytrace.

In addition, FIGS. 5A and 5B further illustrates the travelling light path in the backlight module 1. Please refer to FIGS. 5A and 5B; FIGS. 5A and 5B are exemplary cross-sectional views of one embodiment of the backlight module, wherein FIG. 5A illustrates the structures of the upper light incident surface 310 and the lower light incident surface 320, and FIG. 5B illustrates the travelling path of the light.

For instance, the light incident portion 120 includes the upper light incident surface 310 and the lower light incident surface 320. As shown in FIGS. 5A and 5B, the lower light incident surface 320 receives a lower light 202 generated from the light source module 20, wherein the lower light 202 travels in the light guide plate 10 along a first travelling direction after being reflected by the first incline 1211. In addition, the upper light incident surface 310 receives an upper light 201 also generated from the light source module 20, wherein the upper light 201 travels in the light guide plate 10 along a second travelling direction after being reflected by the second incline 1212.

In the present embodiment, a projection of the upper light incident surface 310 perpendicular to the plane parallel to the top plate surface 111 is closer to the second incline 1212 than the lower light incident surface 320 is. The first travelling direction and the second travelling direction respectively form a first average sector range and a second average sector range, and the first average sector range are approximately parallel to the second average sector range. In other words, the average first travelling direction can be approximately parallel to the average second travelling direction by adjusting the first average slope of the first incline 1211 and the second average slope of the second incline 1212 slope. In preferred embodiment, the base surface 123 is a smooth surface without microstructures so as to avoid the light from leaving the light guide plate 10 by destroying total reflection. When the lower light 202 and the upper light 201 respectively travel along the first travelling direction and the second travelling direction in the light guide plate 10, the lower light 202 travels along the travelling direction approximately parallel to the upper light 201 to enter into the plate body 110. Furthermore, the upper light 201 travels with the first average sector range, the lower light 202 travels with the second average sector range, wherein the first average sector range is approximately parallel to the second average sector range; in other words, the upper light 201 and the lower light 202 have the travelling direction which is approximately parallel to each other, so that the light guide plate may provide more uniform light guide efficiency. In particular, the plate body 110 has a plurality of microstructures, and the microstructures receive the upper light and the lower light along a uniform travelling direction, which helps to lead the light leaving the light guide plate 10 uniformly. In the present embodiment, the light guide efficiency will increase, and the non-uniform brightness phenomena will decrease when the light travels along the uniform travelling direction to transmit to the microstructures of the light guide plate 10. In addition, the structure of the embodiment also assists the transmission efficiency of the light in the plate body 110. In other words, as shown in the results of FIGS. 4A(I) to 4C(II), the backlight module of the embodiments effectively increase the light guide efficiency of the light and decrease the hot spot defective rate.

Further embodiments are provided to illustrate that the first incline and the second incline have different implementation. For instance, in parts of the embodiments, one of the first incline and the second incline is a concave arc surface.

Figure 6A:
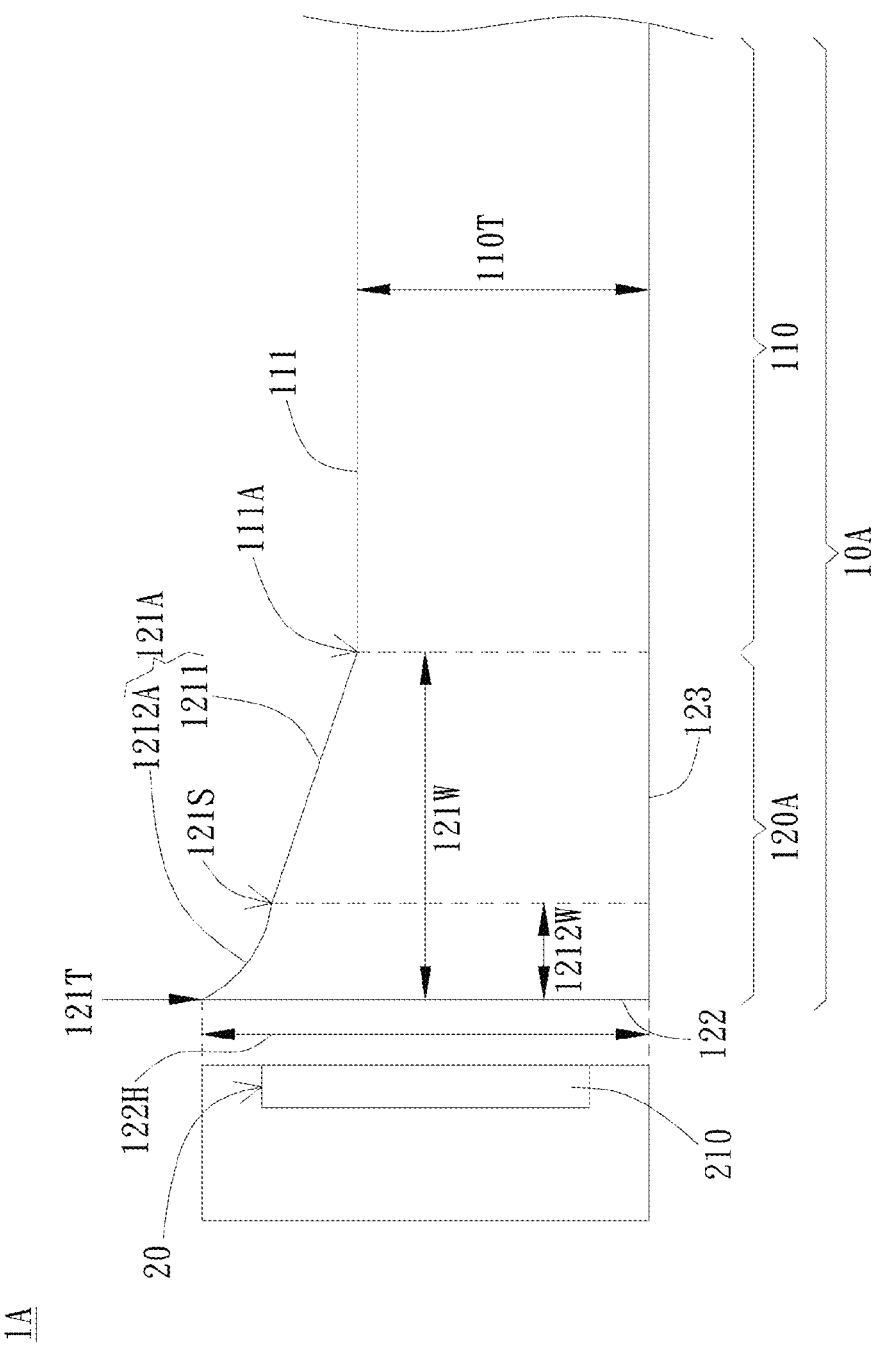
FIG. 6A is a cross-sectional view of additional embodiment of the backlight module of the present invention.
Figure 6B:
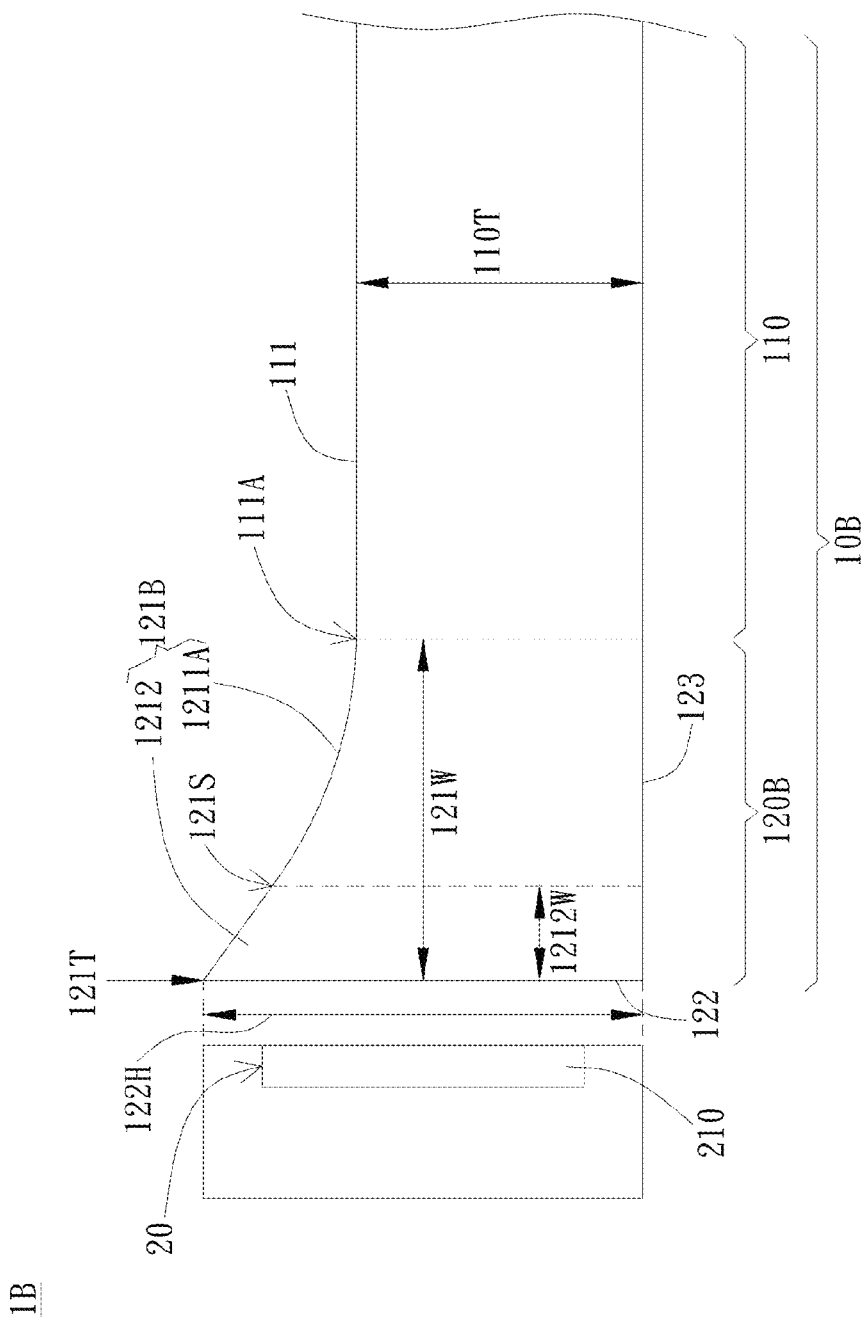
FIG. 6B is a cross-sectional view of additional embodiment of the backlight module of the present invention.
Figure 6C:
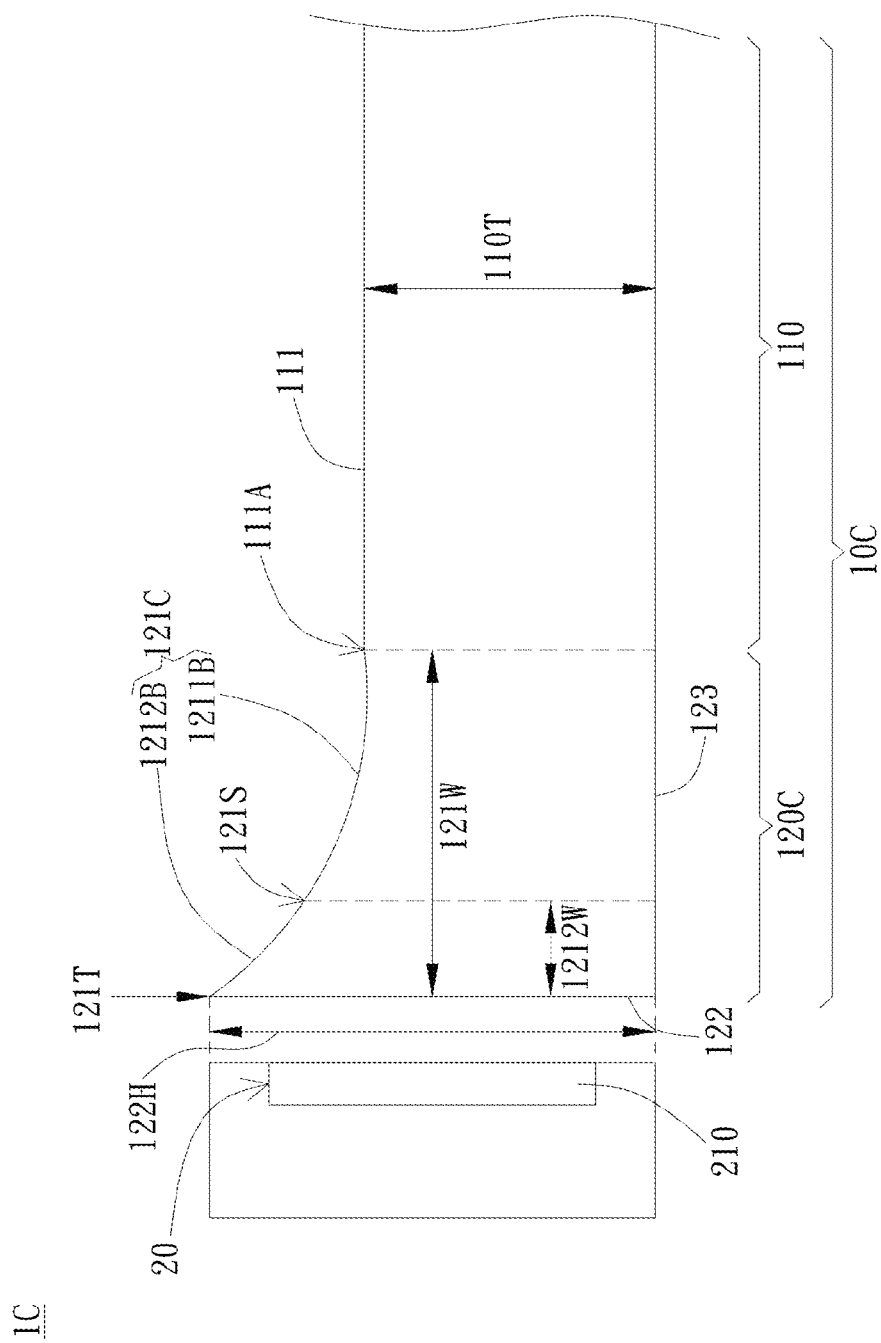
FIG. 6C is a cross-sectional view of additional embodiment of the backlight module of the present invention.

Please refer to FIGS. 6A, 6B, and 6C; wherein FIGS. 6A, 6B, and 6C are respectively cross-sectional view of additional embodiments of the backlight module of the present invention. As shown in FIG. 6A, a part of the top surface 121A of the light incident portion 120A is a concave arc surface. In this embodiment, the second incline 1212A is the concave arc surface, wherein the second average slope of the second incline 1212A is larger than the first average slope of the first incline 1211, and the initial slope of the second incline 1212A near 121S is similar to the first average slope of the first incline 1211. Preferably, the light generates significant reflecting effect after being reflected by the concave arc surface, which is close to the light incident surface 122, to further adjust the travelling direction of the reflected light. In other words, the second incline 1212A provides a more significant light guide effect for the received the upper light.

In addition, as shown in FIG. 6B, a part of top surface 121B of the light incident portion 120B is a concave arc surface. In this embodiment, the first incline 1211A is the concave arc surface, wherein the first average slope of the first incline 1211A is less than the second average slope of the second incline 1212, and the end slope of the first incline 1211A near 121S is similar to the second average slope of the second incline 1212. Preferably, the light generates significant reflecting effect after being reflected by the concave arc surface, which is close to the plate body 110, to further adjust the travelling direction of the reflected light. Preferably, the first incline 1211A provides a more significant light guide effect for the received the lower light.

Please refer to FIG. 6C, the top surface 121C of the light incident portion 120C is a concave arc surface. In this embodiment, the first incline 1211B and the second incline 1212B both are the concave arc surface, wherein the second average slope of the second incline 1212B is larger than the first average slope of the first incline 1211B, and the slope of the second incline 1212B and the first incline 1211B should be continue on 121S. In the embodiment, the first incline 1211B and the second incline 1212B both are the concave arc surface, so that the light generates soft reflecting effect after being reflected by the top surface 121C, to further improve the light guide efficiency.

Figure 7:
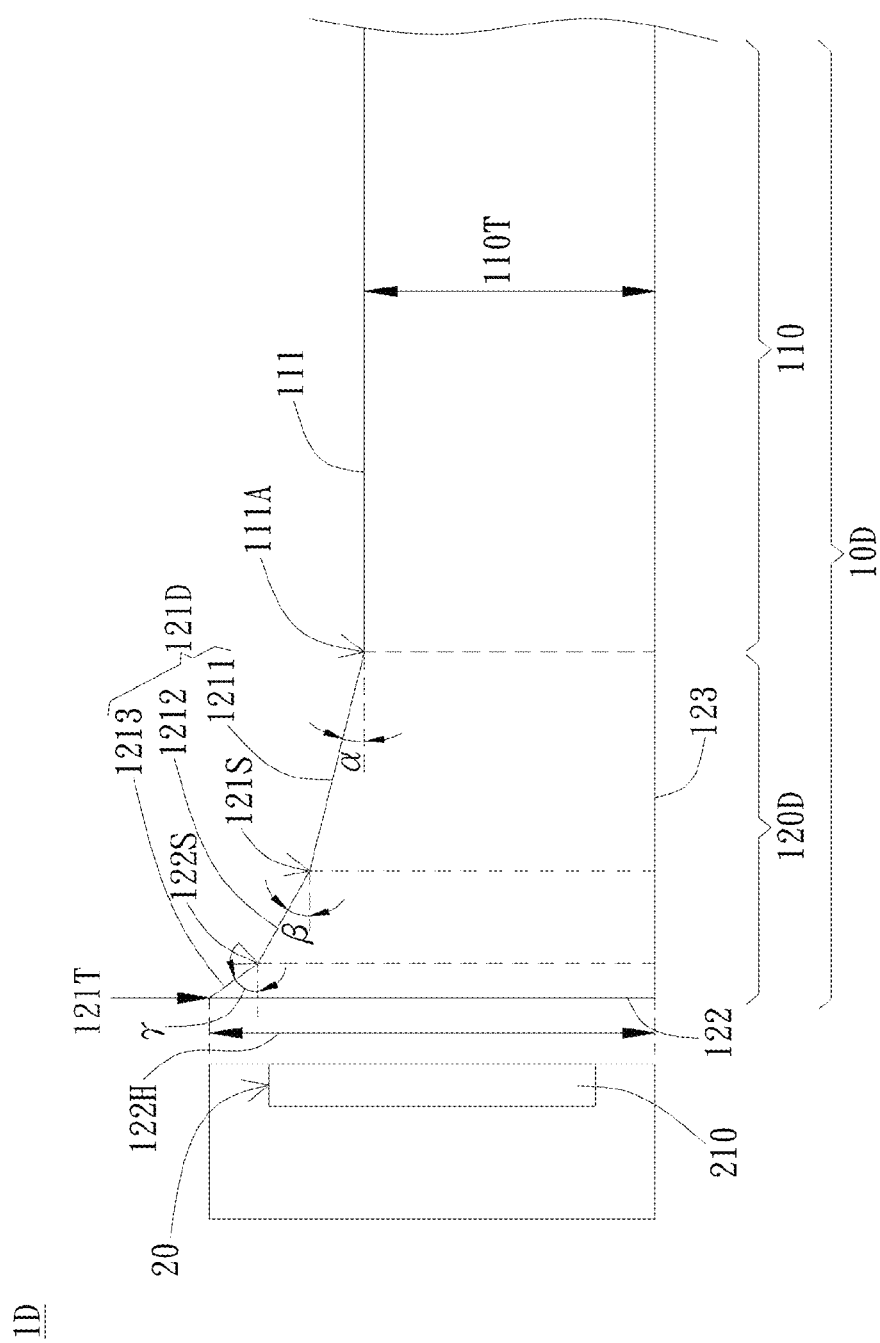
FIG. 7 is a cross-sectional view of another embodiment of the backlight module of the present invention.

Please refer to FIG. 7; FIG. 7 is a cross-sectional view of another embodiment of the backlight module of the present invention. As shown in FIG. 7, the light incident portion 120D of the backlight module 1D has a top surface 121D having a three-stage incline, wherein the top surface 121D further includes a third incline 1213 having a side 122S connected to the side of the second incline 1212 opposite to the first incline 1211, and the light incident surface 122 is connected to the side of the third incline 1213 opposite to the second incline 1212 to form a ridge line 121T.

In this embodiment, the third incline 1213 has a third average slope larger than the second average slope, wherein the inner angle γ between the third incline 1213 and the plane parallel to the top plate surface 111 is larger than 26.8 degree. In other words, the third average slope is larger than the second average slope, the second average slope is larger than the first average slope. Preferably, if the plane parallel to the top plate surface 111 is the horizontal plane, the first incline 1211 is flatter while the second incline 1212 is steeper, and the third incline 1213 is steepest. In addition, the second incline 1212 and the third incline 1213 can do more detailed sectional-reflection for the upper light so as to increase the brightness balance of the light.

Figure 8:
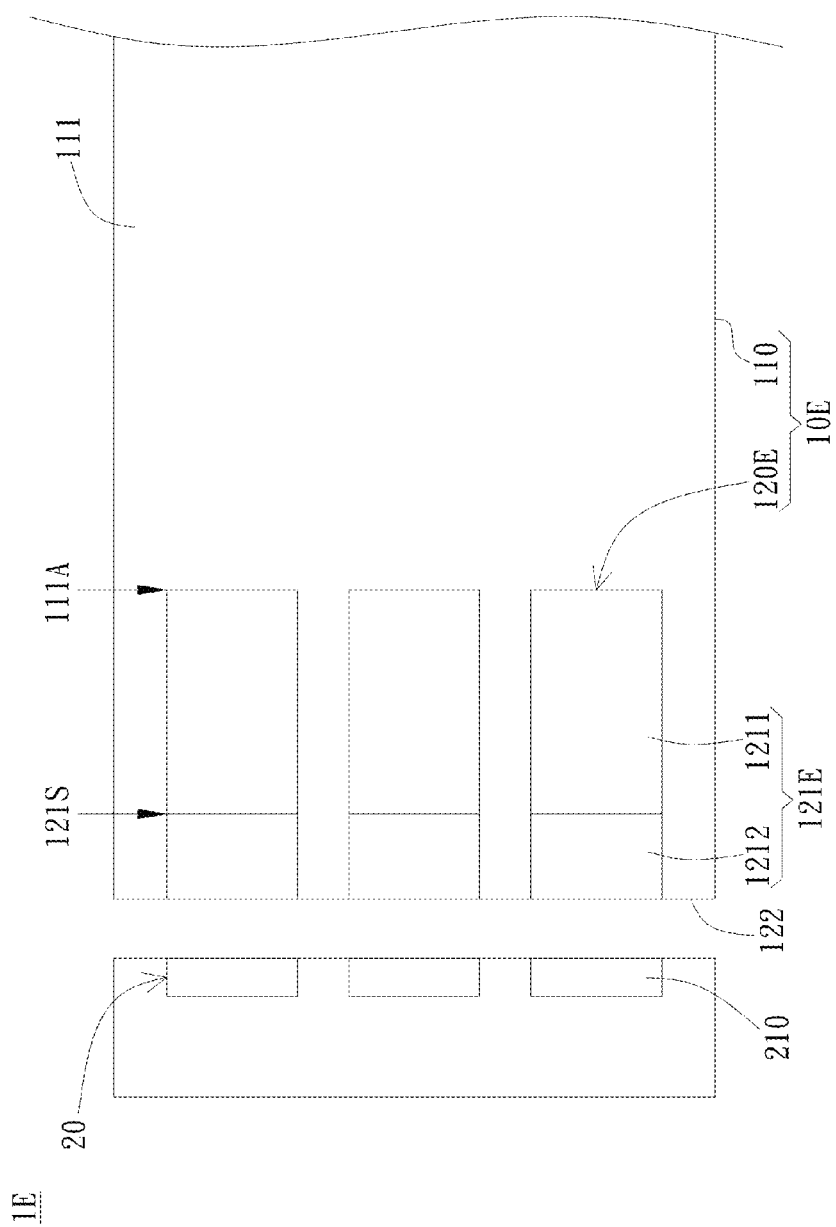
FIG. 8 is a schematic view of another embodiment of the backlight module of the present invention.

Please refer to FIG. 8; FIG. 8 is a schematic view of another embodiment of the backlight module of the present invention. As shown in FIG. 8, the light guide plate 10E has a plurality of the light incident portions 120E, wherein the light incident portions 120E are separately distributed on the side of the plate body 110. It is noted that the light incident portions 120E are disposed on the side of the plate body 110 corresponding to the light-emitting units 210 of the light source module 20. In this embodiment, the light incident portions 120E have the structure similar to the light incident portions 120A to 120D, and the light incident portions 120E are only disposed corresponding to the light-emitting units 210 so as to decrease the cost and improve the product appearance and assembility.

In comparison with previous arts, the light incident portion is provided to change the travelling direction of light, wherein the light is reflected by the first incline and the second incline, so that the light can enter the body along a travelling direction approximately parallel to each other. Preferably, in addition, the backlight module of another embodiment of the present invention utilizes the upper light incident surface and the lower light incident surface layer to adjust the travelling direction of the upper light and the lower light so as to guide light uniformly.

Although the preferred embodiments of present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A light guide plate, comprising:
   a plate body having a top plate surface; and
   a light incident portion formed on a side of the plate body, the light incident portion having a thickness increasing as the light incident portion extends away from a center of the plate body, wherein the light incident portion has a top surface connected to the top plate surface and lifted from the top plate surface to include an angle with the top plate surface, and wherein the top surface comprises:
   a first incline connecting to a side of the top plate surface and having a first average slope; and
   a second incline having a side connected to a side of the first incline opposite to the top plate surface, the second incline having a second average slope that is non-zero and larger than the first average slope;
   wherein the light incident portion includes a light incident surface, the light incident surface is connected to the side of the second incline opposite to the first incline to form a ridge line, and light travels respectively in the light guide plate along a first travelling direction after contact with the first incline and a second travelling direction after contact with the second incline.

2. The light guide plate of claim 1, wherein an inner angle between the second incline and a plane parallel to the top plate surface is larger than an inner angle between the first incline and the plane parallel to the top plate surface.

3. The light guide plate of claim 1, wherein the inner angle between the second incline and the plane parallel to the top plate surface is larger than 18 degrees.

4. The light guide plate of claim 1, wherein the light incident surface is perpendicular to the top plate surface.

5. The light guide plate of claim 4, wherein a ratio of a thickness of the plate body to a height of the light incident surface is less than or equal to 0.42.

6. The light guide plate of claim 1, wherein the light incident portion has a base surface opposite to the first incline and the second incline, and the base surface is a smooth surface without microstructures.

7. The light guide plate of claim 1, wherein a projection of the second incline on a plane parallel to the top plate surface has a second incline width, a projection of the top surface on the plane parallel to the top plate surface has a total width, and a ratio of the second incline width to the total width is less than or equal to 29%.

8. The light guide plate of claim 7, wherein the ratio of the second incline width to the total width is larger than or equal to 5%.

9. The light guide plate of claim 7, wherein an inner angle between the second incline and the plane parallel to the top plate surface is larger than 26.5 degrees when the ratio of the second incline width to the total width is less than 22%.

10. The light guide plate of claim 1, wherein one of the first incline and the second incline is a concave arc surface.

11. The light guide plate of claim 1, comprising a plurality of the light incident portions; wherein the light incident portions are separately distributed on the side of the plate body.

12. The light guide plate of claim 1, wherein the top surface further comprises:
a third incline having a side connected to a side of the second incline opposite to the first incline, the third incline having a third average slope larger than the second average slope; wherein an inner angle between the third incline and a plane parallel to the top plate surface is larger than 26.8 degree.

13. A backlight module, comprising:
a light guide plate comprising:
a plate body having a top plate surface; and
a light incident portion formed on a side of the plate body, the light incident portion having a thickness increasing as the light incident portion extends away from a center of the plate body, wherein the light incident portion has a top surface connected to the top plate surface and lifted from the top plate surface to include an angle with the top plate surface, and wherein the top surface comprises:
a first incline connecting to a side of the top plate surface and having a first average slope; and
a second incline having a side connected to a side of the first incline opposite to the top plate surface, the second incline having a second average slope that is non-zero and larger than the first average slope; and
a light source module transmitting a light to the light incident portion;
wherein the light incident portion includes a light incident surface, the light incident surface is connected to the side of the second incline opposite to the first incline to form a ridge line, and the light from the light source module travels respectively in the light guide plate along a first travelling direction after contact with the first incline and along a second travelling direction after contact with the second incline.

14. The backlight module of claim 13, wherein the light incident portion comprises:
a lower light incident surface receiving a lower light generated from the light source module, wherein the lower light travels in the light guide plate along the first travelling direction after being reflected by the first incline; and
an upper light incident surface receiving an upper light generated from the light source module, wherein the upper light travels in the light guide plate along the second travelling direction after being reflected by the second incline;
wherein a projection of the upper light incident surface perpendicular to a plane parallel to the top plate surface is closer to the second incline than the lower light incident surface is; the first travelling direction and the second travelling direction respectively form a first average sector range and a second average sector range, and the first average sector range are approximately parallel to the second average sector range.

15. The backlight module of claim 13, wherein an inner angle between the second incline and a plane parallel to the top plate surface is larger than an inner angle between the first incline and the plane parallel to the top plate surface.

16. The backlight module of claim 13, wherein the light incident surface is perpendicular to the top plate surface.

17. The backlight module of claim 13, wherein a projection of the second incline on a plane parallel to the top plate surface has a second incline width, a projection of the top surface on the plane parallel to the top plate surface has a total width, and a ratio of the second incline width to the total width is less than or equal to 29%.

18. The backlight module of claim 13, wherein one of the first incline and the second incline is a concave arc surface.

19. The backlight module of claim 13, comprising a plurality of the light incident portions; wherein the light incident portions are separately distributed on the side of the plate body.

20. The backlight module of claim 13, wherein the top surface further comprises:
a third incline having a side connected to a side of the second incline opposite to the first incline, the third incline having a third average slope larger than the second average slope; wherein an inner angle between the third incline and a plane parallel to the top plate surface is larger than 26.8 degree.

* * * * *